US012617990B2

(12) United States Patent
Low

(10) Patent No.:  US 12,617,990 B2
(45) Date of Patent:      May 5, 2026

(54) REFRIGERANT COMPOSITIONS

(71) Applicant: Mexichem Fluor S.A. de C.V., San Luis Potosi (MX)

(72) Inventor: Robert Low, Runcorn (GB)

(73) Assignee: MEXICHEM FLUOR S.A. DE C.V., San Luis Potosi (MX)

( * ) Notice: Subject to any disclaimer, the term of this patent is extended or adjusted under 35 U.S.C. 154(b) by 0 days.

(21) Appl. No.: 17/289,595

(22) PCT Filed: Nov. 12, 2019

(86) PCT No.: PCT/GB2019/053202
§ 371 (c)(1),
(2) Date: Apr. 28, 2021

(87) PCT Pub. No.: WO2020/099857
PCT Pub. Date: May 22, 2020

(65) Prior Publication Data
US 2021/0403777 A1      Dec. 30, 2021

(30) Foreign Application Priority Data

Nov. 12, 2018   (GB) .................................... 1818411
Feb. 11, 2019   (GB) .................................... 1901889
Aug. 14, 2019   (GB) .................................... 1911609

(51) Int. Cl.
| | |
|---|---|
| *C09K 5/04* | (2006.01) |
| *B01D 11/02* | (2006.01) |
| *B01D 11/04* | (2006.01) |
| *C02F 1/26* | (2023.01) |
| *C09K 3/30* | (2006.01) |
| *C11D 7/04* | (2006.01) |
| *C11D 7/30* | (2006.01) |

(52) U.S. Cl.
CPC .......... *C09K 5/044* (2013.01); *B01D 11/0288* (2013.01); *B01D 11/0492* (2013.01); *C02F 1/26* (2013.01); *C09K 3/30* (2013.01); *C09K 5/048* (2013.01); *C11D 7/04* (2013.01); *C11D 7/30* (2013.01); *C09K 2205/106* (2013.01); *C09K 2205/122* (2013.01); *C09K 2205/126* (2013.01); *C09K 2205/128* (2013.01); *C09K 2205/22* (2013.01)

(58) Field of Classification Search
CPC .............. C09K 2205/126; C09K 5/044; C09K 2205/122; C09K 2205/22; C09K 2205/32; C09K 3/30; C09K 5/048; C09K 2205/106; C09K 2205/128; C09K 5/045; C09K 5/04; C09K 5/041; B01D 11/0288; B01D 11/0492; C02F 1/26; C07B 63/04; C11D 7/04; C11D 7/30; C11D 7/505; C11D 11/0041; C11D 7/5018; F02C 3/00; C10M 171/008

USPC .......................................................... 252/67
See application file for complete search history.

(56) References Cited

U.S. PATENT DOCUMENTS

| | | | | |
|---|---|---|---|---|
| 5,611,210 | A | 3/1997 | Nimitz et al. | |
| 7,807,074 | B2 * | 10/2010 | Luly ........................ | H01B 3/56 252/571 |
| 9,175,201 | B2 * | 11/2015 | Singh ..................... | C09K 5/045 |
| 11,136,482 | B2 * | 10/2021 | Low .................. | C10M 171/008 |
| 2008/0157022 | A1 * | 7/2008 | Singh ..................... | C09K 5/045 252/68 |
| 2011/0253927 | A1 | 10/2011 | Minor et al. | |
| 2016/0195321 | A1 * | 7/2016 | Low .......................... | F25B 7/00 516/8 |

(Continued)

FOREIGN PATENT DOCUMENTS

| | | |
|---|---|---|
| CN | 105392859 A | 3/2016 |
| CN | 107987797 A | 5/2018 |

(Continued)

OTHER PUBLICATIONS

International Search Report for corresponding International Application No. PCT/GB2019/053202, mailed Jan. 27, 2020, 3 pgs.
Written Opinion of the International Searching Authority for corresponding International Application No. PCT/GB2019/053202, mailed Jan. 27, 2020, 5 pgs.
Chinese Office Action for corresponding Chinese patent application No. 201980074170.5, dated Jan. 19, 2023, 16 pgs. English translation only.
European Examination Report for corresponding European patent application No. 19809545.7, dated Nov. 23, 2022, 5 pgs.

*Primary Examiner* — Matthew R Diaz
(74) *Attorney, Agent, or Firm* — Crowell & Moring LLP

(57) ABSTRACT

A composition comprising trifluoroiodomethane ($CF_3I$) and 1,1-difluoroethylene (R-1132a) is described. The composition can also comprise additional compounds, such as at least one non-flammable compound selected from the group consisting of carbon dioxide ($CO_2$; R-744), tetrafluoromethane (R-14), trifluoromethane (R-23) and perfluoroethane (R-116) or at least one additional compound of lower volatility than 1,1-difluoroethylene selected from the group consisting of 1,1,2-trifluoroethylene (R-1123), difluoromethane (R-32), propane (R-290), propylene (R-1270), fluoroethane (R-161), pentafluoroethane (R-125), 1,1,1,2-tetrafluoroethane (R-134a), 2,3,3,3-tetrafluoropropene (R-1234yf), isobutane (R-600a), n-butane (R-600), trans-1,3,3,3-tetrafluoropropene (R-1234ze(E)), 3,3,3-trifluoropropene (R-1243zf), 1,2,3,3,3-pentafluoropropene (R-1225ye), 1,1,1,2,3,3,3-heptafluoropropane (R-227ea), 1,1-difluoroethane (R-152a), cis-1,3,3,3-tetrafluoropropene (R-1234ze(Z)), 1-chloro-3,3,3-trifluoropropene (R-1233zd(E/Z)) and 1,1,1,4,4,4-hexafluoro-2-butene (R-1336mzz(E/Z)). The compositions have utility as refrigerants in vapour compression heat transfer systems.

38 Claims, No Drawings

(56)                 References Cited

U.S. PATENT DOCUMENTS

| | | | |
|---|---|---|---|
| 2018/0002586 A1 | 1/2018 | Low et al. | |
| 2018/0244969 A1 | 8/2018 | Sethi et al. | |
| 2018/0362441 A1* | 12/2018 | Low | C07C 69/63 |
| 2019/0136108 A1* | 5/2019 | Singh | C09K 5/045 |
| 2021/0261840 A1* | 8/2021 | Low | C10M 107/34 |

FOREIGN PATENT DOCUMENTS

| | | | |
|---|---|---|---|
| GB | 2516694 A  * | 2/2015 | C09K 5/045 |
| GB | 2516694 B | 9/2016 | |
| WO | WO 2014/159315 A1 | 10/2014 | |
| WO | WO 2018/211283 A1 | 11/2018 | |
| WO | WO 2019/030508 A1 | 2/2019 | |
| WO | WO 2020/035690 A1 | 2/2020 | |

OTHER PUBLICATIONS

Written Opinion for corresponding Singaporean patent application No. 11202104306X, dated May 9, 2022, 8 pgs.
Office Action mailed Jul. 26, 2023, for corresponding Japanese Patent Application No. 2021-525626, with English translation, 4 pgs.
English translation of Chinese Office Action for corresponding Chinese Application No. 201980074170.5, dated Jul. 31, 2023, 15 pgs.

* cited by examiner

REFRIGERANT COMPOSITIONS

CROSS-REFERENCE TO RELATED APPLICATIONS

This application is the U.S. National Stage application of PCT International application no. PCT/GB2019/053202, filed on Nov. 12, 2019, titled COMPOSITIONS, designating the United States, which claims priority to Great Britain application no. 1911609.4, filed on Aug. 14, 2019, to Great Britain application no. 1901889.4, filed Feb. 11, 2019, and to Great Britain application no. 1818411.9, filed on Nov. 12, 2018, the contents of each are which incorporated herein by reference in their entirety.

The present invention relates to compositions and more particularly to refrigerant compositions comprising 1,1-difluoroethylene (R-1132a; vinylidene fluoride) and trifluoroiodomethane (CF$_3$I) that are useful as working fluids in vapour compression cycles for refrigeration, air-conditioning and heat pump applications.

The use of trifluoroiodomethane (CF$_3$I) as a refrigerant has been proposed. The attraction of CF$_3$I as a refrigerant component is that it can chemically suppress the flammability of flammable refrigerants with which it is blended. Blends comprising flammable refrigerants, such as R-1234yf (2,3,3,3-tetrafluoropropene) with non-flammable refrigerants, such as R-134a (1,1,1,2-tetrafluoroethane), already exist. However, in the absence of any chemical flame suppression effect, the flammability can only be mitigated by physical dilution with the non-flammable refrigerant. This means that even a weakly flammable refrigerant like R-1234yf must be mixed in almost 50/50 proportions with non-flammable R-134a. Furthermore, as non-flammable fluorinated refrigerants like R-134a and R-125 tend to have high Global Warming Potentials (GWP), a non-flammable mixture comprising at least one flammable, low GWP refrigerant like R-1234yf and a non-flammable, fluorinated refrigerant will still have a relatively high GWP compared to that of the flammable refrigerant alone. Regulations restricting the quantity of high-GWP refrigerants that can be used already exist in Europe and are pending in the Kigali Amendment to the Montreal Protocol. As a result, it is desirable to find mixtures and preferably non-flammable mixtures with lower GWPs than are currently available. Trifluoroiodomethane has a very low effective GWP and so is potentially of interest in suppressing the flammability of any flammable refrigerants with which it is mixed in binary, ternary and higher refrigerant mixtures.

1,1-difluoroethylene is a high capacity, flammable refrigerant with a boiling point of −83° C. It is classified by ASHRAE in flammability class 2 by the ASHRAE Standard 34:2016 test method.

Non-flammable refrigerants have traditionally been considered the most desirable and versatile class of refrigerant, but the growing desire for refrigerants having very low GWPs means that there is increasing acceptance of refrigerants which are flammable, but whose flammability is reduced compared to highly flammable refrigerants like propane, or even compared to moderately flammable refrigerants. In particular, the use of refrigerants classed as "weakly flammable" (2L) by ASHRAE Standard 34:2016 is now being considered by the industry. Several manufacturers already offer equipment for refrigeration, air-conditioning and heat pump applications using 2L flammability class refrigerants. 2L refrigerants are distinguished from other moderately flammable refrigerants by exhibiting a low burning velocity of less than 10 cm/s.

There is a need for a non-flammable or weakly flammable refrigerant composition with a low GWP that can operate efficiently in vapour compression cycles for refrigeration, air-conditioning and heat pump applications. In particular, there is a need for a non-flammable or weakly flammable refrigerant composition that exploits the beneficial properties of 1,1-difluoroethylene (R-1132a) and, in particular, its high refrigeration capacity.

We have found that compositions comprising 1,1-difluoroethylene (R-1132a; vinylidene fluoride) and trifluoroiodomethane (CF$_3$I) and preferably at least one further refrigerant compound are useful as working fluids in vapour compression cycles for refrigeration, air-conditioning and heat pump applications. Furthermore, the non-flammable trifluoroiodomethane can in preferred embodiments effectively supress the flammability of flammable refrigerants including 1,1-difluoroethylene contained in the compositions to result in refrigerant compositions that are either weakly flammable (flammability class 2L) and preferably non-flammable as determined in accordance with the test method of ASHRAE Standard 34:2016. The compositions may also be used as solvents, foam blowing agents, propellants, degreasing agents, and as working fluids in Organic Rankine Cycle equipment for generation of mechanical or electrical power.

Accordingly, one aspect of the present invention provides a composition, especially a refrigerant composition, comprising 1,1-difluoroethylene (R-1132a) and trifluoroiodomethane (CF$_3$I).

As used herein, all % amounts mentioned in compositions herein, including in the claims, are by weight based on the total weight of the compositions, unless otherwise stated.

For the avoidance of doubt, it is to be understood that the stated upper and lower values for ranges of amounts of components in the compositions of the invention described herein may be interchanged in any way, provided that the resulting ranges fall within the broadest scope of the invention.

The terms "binary", "ternary", "quaternary" and the like as used herein in connection with the compositions of the present invention include the meaning that such compositions can comprise a certain amount of other components, e.g. impurities and/or additives, such as those resulting from the manufacture of said compositions and/or from putting the compositions of the invention into practice.

In an embodiment, compositions of the invention defined as "binary", "ternary", "quaternary", and/or any other compositions of the invention disclosed herein, may consist essentially of the stated components.

By the term "consist essentially of", we include the meaning that the compositions of the invention contain substantially no other components, particularly no further (hydro)(fluoro)compounds (e.g. (hydro)(fluoro)alkanes or (hydro)(fluoro)alkenes) known to be used in heat transfer compositions. The term "consist of" is included within the meaning of "consist essentially of".

In an embodiment, the compositions of the invention are substantially free of any component that has heat transfer properties (other than the components specified). For instance, the compositions of the invention may be substantially free of any other hydrofluorocarbon compound.

By "substantially no" and "substantially free of", we include the meaning that the compositions of the invention contain 0.5% by weight or less of the stated component, preferably 0.1% by weight or less, based on the total weight of the composition In one preferred embodiment, the composition of the present invention is a binary composition of 1,1-difluoroethylene (R-1132a) and trifluoroiodomethane ($CF_3I$). Such compositions will typically comprise from 1 to 95 weight %, e.g. from 1 to 50 weight %, of trifluoroiodomethane and from 99 to 5 weight %, e.g. from 99 to 50 weight %, of 1,1-difluoroethylene based on the total weight of the composition.

Preferred binary compositions comprise from 1 to 40 weight % of trifluoroiodomethane and from 99 to 60 weight % of 1,1-difluoroethylene, more preferably from 1 to 30 weight % of trifluoroiodomethane and from 99 to 70 weight % of 1,1-difluoroethylene and particularly from 1 to 20 weight % of trifluoroiodomethane and from 99 to 80 weight % of 1,1-difluoroethylene. The weight percentages quoted above are based on the total weight of the composition. The binary mixtures are preferably non-flammable or only weakly flammable as determined by the test method of ASHRAE Standard 34:2016.

In a preferred embodiment, the 1,1-difluoroethylene (R-1132a) and trifluoroiodomethane ($CF_3I$) are blended with one or more additional refrigerant compounds to provide ternary and higher mixtures Accordingly, another aspect of the present invention provides a ternary or higher composition, especially a ternary or higher refrigerant composition, comprising 1,1-difluoroethylene (R-1132a), trifluoroiodomethane ($CF_3I$) and at least one non-flammable compound selected from the group consisting of carbon dioxide ($CO_2$; R-744), tetrafluoromethane (R-14), trifluoromethane (R-23) and perfluoroethane (R-116).

Such compositions will typically comprise from 1 to 95 weight %, e.g. from 1 to 50 weight %, of trifluoroiodomethane and from 99 to 5 weight %, e.g. from 99 to 50 weight %, of 1,1-difluoroethylene and the at least one non-flammable compound selected from the group consisting of carbon dioxide, tetrafluoromethane, trifluoromethane and perfluoroethane based on the total weight of the composition.

In one embodiment, the compositions of the present invention comprise from 99 to 70 weight % of $CF_3I$ and from 1 to 30 weight % of R-1132a, preferably from 99 to 80 weight % of $CF_3I$ and from 1 to 20 weight % of R-1132a, for example from 97 to 85 weight % of $CF_3I$ and from 3 to 15 weight % of R-1132a, based on the total weight of the composition.

Preferred compositions comprise from 1 to 40 weight % of trifluoroiodomethane and from 99 to 60 weight % of 1,1-difluoroethylene and the at least one non-flammable compound selected from the group consisting of carbon dioxide, tetrafluoromethane, trifluoromethane and perfluoroethane, more preferably from 1 to 30 weight % of trifluoroiodomethane and from 99 to 70 weight % of 1,1-difluoroethylene and the at least one non-flammable compound and particularly from 1 to 20 weight % of trifluoroiodomethane and from 99 to 80 weight % of 1,1-difluoroethylene and the at least one non-flammable compound. The weight percentages quoted above are based on the total weight of the composition.

The amount of the at least one non-flammable compound selected from the group consisting of carbon dioxide, tetrafluoromethane, trifluoromethane and perfluoroethane in the composition is preferably selected so that the composition is only weakly flammable and preferably non-flammable as determined by the test method of ASHRAE Standard 34:2016.

More preferably, the amount of the at least one non-flammable compound selected from the group consisting of carbon dioxide, tetrafluoromethane, trifluoromethane and perfluoroethane in the composition is selected to ensure that if the overall composition is held at two phase equilibrium, i.e. with both liquid and vapour phases being present, for example in a cylinder or vapor compression system, then the vapour phase composition will remain non-flammable.

Another aspect of the present invention provides a ternary or higher composition, especially a ternary or higher refrigerant composition, comprising 1,1-difluoroethylene (R-1132a), trifluoroiodomethane ($CF_3I$) and at least one compound of lower volatility than 1,1-difluoroethylene selected from the group consisting of 1,1,2-trifluoroethylene (R-1123), difluoromethane (R-32), propane (R-290), propylene (R-1270), fluoroethane (R-161), pentafluoroethane (R-125), 1,1,1,2-tetrafluoroethane (R-134a), 2,3,3,3-tetrafluoropropene (R-1234yf), isobutane (R-600a), n-butane (R-600), trans-1,3,3,3-tetrafluoropropene (R-1234ze(E)), 3,3,3-trifluoropropene (R-1243zf), 1,2,3,3,3-pentafluoropropene (R-1225ye), 1,1,1,2,3,3,3-heptafluoropropane (R-227ea), 1,1-difluoroethane (R-152a), cis-1,3,3,3-tetrafluoropropene (R-1234ze(Z)), 1-chloro-3,3,3-trifluoropropene (R-1233zd(E/Z)) and 1,1,1,4,4,4-hexafluoro-2-butene (R-1336mzz(E/Z)).

Such compositions will typically comprise from 1 to 95 weight %, e.g. from 1 to 50 weight %, of $CF_3I$ and from 99 to 5 weight %, e.g. from 99 to 50 weight %, of R-1132a and the at least one compound of lower volatility than R-1132a based on the total weight of the composition.

Preferred compositions comprise from 1 to 40 weight % of $CF_3I$ and from 99 to 60 weight % of R-1132a and the at least one compound of lower volatility than R-1132a, more preferably from 1 to 30 weight % of $CF_3I$ and from 99 to 70 weight % of R-1132a and the at least one lower volatility compound and particularly from 1 to 20 weight % of $CF_3I$ and from 99 to 80 weight % of R-1132a and the at least one lower volatility compound. The weight percentages quoted above are based on the total weight of the composition.

In an embodiment, the compositions of the invention contain R-1132a in an amount of from about 1 to about 40 weight %, preferably from about 1 to about 30 weight %, such as from about 1 to about 20 weight %, for example from about 1 to about 10 weight %, based on the total weight of the composition.

Preferably, the $CF_3I$ is present in the composition in an amount of from about 1 to about 70 weight %, preferably from about 1 to about 60 weight %, such as from about 1 to about 50 or 40 weight %, for example from about 1 to about 30 weight %, based on the total weight of the composition.

Certain preferred compositions according to this embodiment include those comprising:

from about 1 to about 40 weight % R-1132a, from about 1 to about 50 weight % $CF_3I$ and from about 1 to about 30 weight % R-1123;

from about 1 to about 40 weight % R-1132a, from about 1 to about 70 weight % $CF_3I$ and from about 1 to about 50 weight % R-32;

from about 1 to about 40 weight % R-1132a, from about 1 to about 50 weight % $CF_3I$ and from about 1 to about 20 weight %, preferably from about 1 to about 10 weight %, such as from about 1 to about 5 weight % R-290;

from about 1 to about 40 weight % R-1132a, from about 1 to about 50 weight % $CF_3I$ and from about 1 to about 20 weight % R-125;

from about 1 to about 40 weight % R-1132a, from about 1 to about 50 weight % CF$_3$I and from about 1 to about 20 weight %, preferably from about 1 to about 10 weight %, such as from about 1 to about 5 weight % R-1270;

from about 1 to about 40 weight % R-1132a, from about 1 to about 50 weight % CF$_3$I and from about 1 to about 40 weight % R-134a;

from about 1 to about 40 weight % R-1132a, from about 1 to about 50 weight % CF$_3$I and from about 1 to about 40 weight % R-1234yf;

from about 1 to about 40 weight % R-1132a, from about 1 to about 50 weight % CF$_3$I and from about 1 to about 40 weight % R-1234ze(E);

from about 1 to about 40 weight % R-1132a, from about 1 to about 50 weight % CF$_3$I and from about 1 to about 20 weight % R-227ea; or from about 1 to about 40 weight % R-1132a, from about 1 to about 50 weight % CF$_3$I and from about 1 to about 40 weight % R-152a.

The compositions of the invention may further comprise CO$_2$. When included, the CO$_2$ is typically present in an amount of from about 1 to about 40 weight %, preferably from about 1 to about 30 weight %, such as from about 1 to about 20 weight %, for example from about 1 to about 10 weight %, based on the total weight of the composition. Preferred compositions containing CO$_2$ include the following compositions comprising:

from about 1 to about 40 weight % R-1132a, from about 1 to about 50 weight % CF$_3$I, and from about 1 to about 40 weight % CO$_2$;

from about 1 to about 40 weight % R-1132a, from about 1 to about 50 weight % CF$_3$I, from about 1 to about 40 weight % R-1123 and from about 1 to about 40 weight % CO$_2$;

from about 1 to about 40 weight % R-1132a, from about 1 to about 70 weight % CF$_3$I, from about 1 to about 50 weight % R-32 and from about 1 to about 40 weight % CO$_2$;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-290 and from about 1 to about 40 weight % CO$_2$;

from about 1 to about 40 weight % R-1132a, from about 1 to about 50 weight % CF$_3$I, from about 1 to about 20 weight % R-125 and from about 1 to about 40 weight % CO$_2$;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-1270 and from about 1 to about 40 weight % CO$_2$;

from about 1 to about 40 weight % R-1132a, from about 1 to about 50 weight % CF$_3$I, from about 1 to about 40 weight % R-134a and from about 1 to about 40 weight % CO$_2$;

from about 1 to about 40 weight % R-1132a, from about 1 to about 50 weight % CF$_3$I, from about 1 to about 50 weight % R-1234yf and from about 1 to about 40 weight % CO$_2$;

from about 1 to about 40 weight % R-1132a, from about 1 to about 50 weight % CF$_3$I, from about 1 to about 20 weight % R-227ea and from about 1 to about 40 weight % CO$_2$;

from about 1 to about 40 weight % R-1132a, from about 1 to about 50 weight % CF$_3$I, from about 1 to about 50 weight % R-152a and from about 1 to about 40 weight % CO$_2$;

from about 1 to about 40 weight % R-1132a, from about 1 to about 40 weight % CF$_3$I, from about 1 to about 40 weight % R-32 and from about 1 to about 20 weight % CO$_2$ and from about 1 to about 40 weight % R-1234yf;

from about 1 to about 40 weight % R-1132a, from about 1 to about 40 weight % CF$_3$I, from about 1 to about 40 weight % R-32 and from about 1 to about 20 weight % CO$_2$ and from about 1 to about 40 weight % R-1234ze (E); or from about 1 to about 40 weight % R-1132a, from about 1 to about 40 weight % CF$_3$I, from about 1 to about 40 weight % R-32 and from about 1 to about 20 weight % CO$_2$ and from about 1 to about 40 weight % R-152a.

Other preferred compositions according to the present invention include those comprising:

from about 1 to about 40 weight % R-1132a, from about 1 to about 70 weight % CF$_3$I, from about 1 to about 30 weight % R-1123 and from about 1 to about 60 weight % R-32;

from about 1 to about 40 weight % R-1132a, from about 1 to about 50 weight % CF$_3$I, from about 1 to about 30 weight % R-1123 and from about 1 to about 20 weight %, preferably from about 1 to about 10 weight %, such as from about 1 to about 5 weight % R-290;

from about 1 to about 40 weight % R-1132a, from about 1 to about 50 weight % CF$_3$I, from about 1 to about 40 weight % R-1123 and from about 1 to about 20 weight % R-125;

from about 1 to about 40 weight % R-1132a, from about 1 to about 50 weight % CF$_3$I, from about 1 to about 30 weight % R-1123 and from about 1 to about 20 weight %, preferably from about 1 to about 10 weight %, such as from about 1 to about 5 weight % R-1270;

from about 1 to about 40 weight % R-1132a, from about 1 to about 50 weight % CF$_3$I, from about 1 to about 40 weight % R-1123 and from about 1 to about 40 weight % R-134a;

from about 1 to about 40 weight % R-1132a, from about 1 to about 50 weight % CF$_3$I, from about 1 to about 40 weight % R-1123 and from about 1 to about 50 weight % R-1234yf;

from about 1 to about 40 weight % R-1132a, from about 1 to about 50 weight % CF$_3$I, from about 1 to about 40 weight % R-1123 and from about 1 to about 20 weight % R-227ea;

from about 1 to about 40 weight % R-1132a, from about 1 to about 50 weight % CF$_3$I, from about 1 to about 40 weight % R-1123 and from about 1 to about 40 weight % R-152a;

from about 1 to about 40 weight % R-1132a, from about 1 to about 50 weight % CF$_3$I, from about 1 to about 50 weight % R-32 and from about 1 to about 20 weight %, preferably from about 1 to about 10 weight %, such as from about 1 to about 5 weight % R-290;

from about 1 to about 40 weight % R-1132a, from about 1 to about 70 weight % CF$_3$I, from about 1 to about 50 weight % R-32 and from about 1 to about 20 weight % R-125;

from about 1 to about 40 weight % R-1132a, from about 1 to about 50 weight % CF$_3$I, from about 1 to about 50 weight % R-32 and from about 1 to about 20 weight %, preferably from about 1 to about 10 weight %, such as from about 1 to about 5 weight % R-1270;

from about 1 to about 40 weight % R-1132a, from about 1 to about 50 weight % CF$_3$I, from about 1 to about 50 weight % R-32 and from about 1 to about 40 weight % R-134a;

from about 1 to about 40 weight % R-1132a, from about 1 to about 50 weight % CF$_3$I, from about 1 to about 50 weight % R-32 and from about 1 to about 40 weight % R-1234yf;

from about 1 to about 40 weight % R-1132a, from about 1 to about 50 weight % CF$_3$I, from about 1 to about 50 weight % R-32 and from about 1 to about 20 weight % R-227ea;

from about 1 to about 40 weight % R-1132a, from about 1 to about 50 weight % CF$_3$I, from about 1 to about 50 weight % R-32 and from about 1 to about 40 weight % R-152a;

from about 1 to about to 40 weight % R-1132a, from about 1 to about 50 weight % CF$_3$I, from about 1 to about 20 weight %, preferably from about 1 to about 10 weight %, such as from about 1 to about 5 weight % R-290 and from about 1 to about 20 weight % R-125;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-290 and from about 1 to about 20 weight %, preferably from about 1 to about 10 weight %, such as from about 1 to about 5 weight % R-1270;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-290 and from about 1 to about 40 weight % R-134a;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-290 and from about 1 to about 50 weight % R-1234yf;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-290 and from about 1 to about 20 weight % R-227ea;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-290 and from about 1 to about 50 weight % R-152a;

from about 1 to about 40 weight % R-1132a, from about 1 to about 50 weight % CF$_3$I, from about 1 to about 20 weight % R-125 and from about 1 to about 20 weight %, preferably from about 1 to about 10 weight %, such as from about 1 to about 5 weight % R-1270;

from about 1 to about 40 weight % R-1132a, from about 1 to about 50 weight % CF$_3$I, from about 1 to about 20 weight % R-125 and from about 1 to about 40 weight % R-134a;

from about 1 to about 40 weight % R-1132a, from about 1 to about 50 weight % CF$_3$I, from about 1 to about 20 weight % R-125 and from about 1 to about 40 weight % R-1234yf;

from about 1 to about 40 weight % R-1132a, from about 1 to about 50 weight % CF$_3$I, from about 1 to about 20 weight % R-125 and from about 1 to about 20 weight % R-227ea;

from about 1 to about 40 weight % R-1132a, from about 1 to about 50 weight % CF$_3$I, from about 1 to about 20 weight % R-125 and from about 1 to about 50 weight % R-152a;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-1270 and from about 1 to about 40 weight % R-134a;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-1270 and from about 1 to about 50 weight % R-1234yf;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-1270 and from about 1 to about 50 weight % R-227ea;

from about 1 to about 40 weight % R-1132a, from about 1 to about 50 weight % CF$_3$I, from about 1 to about 20 weight %, preferably from about 1 to about 10 weight %, such as from about 1 to about 5 weight % R-1270 and from about 1 to about 50 weight % R-152a;

from about 1 to about 40 weight % R-1132a, from about 1 to about 50 weight % CF$_3$I, from about 1 to about 50 weight % R-134a and from about 1 to about 40 weight % R-1234yf;

from about 1 to about 40 weight % R-1132a, from about 1 to about 50 weight % CF$_3$I, from about 1 to about 40 weight % R-134a and from about 1 to about 20 weight % R-227ea;

from about 1 to about 40 weight % R-1132a, from about 1 to about 50 weight % CF$_3$I, from about 1 to about 40 weight % R-134a and from about 1 to about 50 weight % R-152a;

from about 1 to about 40 weight % R-1132a, from about 1 to about 50 weight % CF$_3$I, from about 1 to about 50 weight % R-1234yf and from about 1 to about 20 weight % R-227ea;

from about 1 to about 40 weight % R-1132a, from about 1 to about 50 weight % CF$_3$I, from about 1 to about 50 weight % R-1234yf and from about 1 to about 50 weight % R-152a; or from about 1 to about 40 weight % R-1132a, from about 1 to about 50 weight % CF$_3$I, from about 1 to about 20 weight % R-227ea and from about 1 to about 40 weight % R-152a;

In one embodiment, the compositions of the present invention comprise CF$_3$I, R-1132a and R-1234yf, preferably from 15 to 98 weight % of CF$_3$I, from 1 to 15 weight % of R-1132a and from 1 to 80 weight % of R-1234yf, such as from 25 to 87 weight % of CF$_3$I, from 3 to 10 weight % of R-1132a and from 5 to 75 weight % of R-1234yf based on the total weight of the composition.

In another embodiment, the compositions of the present invention comprise CF$_3$I, R-1132a, R-32 and R-1234yf, preferably from 15 to 97 weight % of CF$_3$I, from 1 to 15 weight % of R-1132a, from 1 to 20 weight % of R-32 and from 1 to 70 weight % of R-1234yf, such as from 28 to 82 weight % of CF$_3$I, from 3 to 10 weight % of R-1132a, from 5 to 12 weight % of R-32 and from 5 to 60 weight % of R-1234yf based on the total weight of the composition.

The compositions of the invention may also comprise a stabilizer, e.g. as described in US 2018/0244969 at paragraphs [0350] to [0361]. Where a stabiliser is included, the amounts in the composition of the invention are typically in the range of from 0.001 to 10.0 weight %, preferably in the range of from 0.001 to 5.0 weight %, more preferably in the range of from 0.01 to 3.0 weight % and particularly in the range of from 0.1 to 2.0 weight % based on the total weight of the composition.

The compositions of the present invention preferably have zero ozone depletion potential.

The compositions according to the present invention typically have a GWP of less than about 650, such as less than about 500, for example less than about 400. Preferably, the compositions of the invention have a GWP of less than about 300, such as less than about 200, for example less than about 150.

The compositions of the invention preferably have a temperature glide in an evaporator or condenser of less than about 15K, even more preferably less than about 10K, and even more preferably less than about 5K.

In an embodiment, the compositions may consist essentially of the stated components. By the term "consist essentially of", we include the meaning that the compositions of the invention contain substantially no other components, particularly no further (hydro)(fluoro)compounds (e.g. (hydro)(fluoro)alkanes or (hydro)(fluoro)alkenes) known to be used in heat transfer compositions. The term "consist of" is included within the meaning of "consist essentially of".

Typically, the compositions of the invention are of reduced flammability hazard when compared to R-1132a.

Flammability may be determined in accordance with ASHRAE Standard 34 incorporating the ASTM Standard E-681 with test methodology as per Addendum 34p dated 2004, the entire content of which is incorporated herein by reference.

In one aspect, the compositions have one or more of (a) a higher lower flammable limit; (b) a higher ignition energy (c) higher auto ignition temperature or (d) a lower burning velocity compared to R-1132a alone. Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or burning velocity. The flammable limits and burning velocity being determined according to the methods specified in ASHRAE-34 and the auto-ignition temperature being determined in a 500 ml glass flask by the method of ASTM E659-78.

In a preferred embodiment, the compositions of the invention are non-flammable. For example, the compositions of the invention are non-flammable at a test temperature of 60° C. using the ASHRAE-34 methodology. Advantageously, the mixtures of vapour that exist in equilibrium with the compositions of the invention at any temperature between about −20° C. and 60° C. are also non-flammable.

In some applications it may not be necessary for the formulation to be classed as non-flammable by the ASHRAE-34 methodology. It is possible to develop fluids whose flammability limits will be sufficiently reduced in air to render them safe for use in the application, for example if it is physically not possible to make a flammable mixture by leaking the refrigeration equipment charge into the surrounds.

In one embodiment, the compositions of the invention have a flammability classifiable as 1 or 2L according to the ASHRAE standard 34 classification method, indicating non-flammability (class 1) or a weakly flammable fluid with flame speed lower than 10 cm/s (class 2L).

It is believed that the compositions of the invention exhibit a completely unexpected combination of low-/non-flammability, low GWP, improved lubricant miscibility and improved refrigeration performance properties. Some of these refrigeration performance properties are explained in more detail below.

The compositions of the invention are typically suitable for use in existing designs of equipment and are compatible with all classes of lubricant currently used with established HFC refrigerants. They may be optionally stabilised or compatibilised with mineral oils by the use of appropriate additives.

In one embodiment, the invention provides a heat transfer device comprising a composition of the invention. Preferably, the heat transfer device is a refrigeration device.

Conveniently, the heat transfer device is a residential or commercial air conditioning system, a heat pump or a commercial or industrial refrigeration system.

The invention also provides the use of a composition of the invention in a heat transfer device, such as a refrigeration system, as herein described.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device, such as an ultra-low temperature refrigeration system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

The compositions of the invention may also be prepared simply by mixing the R-1132a and CF$_3$I (and optional components such as R-744, R-1123, hydrocarbons, a lubricant, a stabiliser) in the desired proportions. The compositions can then be added to a heat transfer device (or used in any other way as defined herein).

In a further aspect of the invention, there is provided a method for reducing the environmental impact arising from operation of a product comprising an existing compound or composition, the method comprising replacing at least partially the existing compound or composition with a composition of the invention.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems.

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP). The use of LCCP is common in assessing environmental impact of automotive air conditioning systems.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and ultra-low temperature refrigeration), heat transfer, aerosols or sprayable propellants, gaseous dielectrics, flame suppression, solvents (e.g. carriers for flavorings and fragrances), cleaners, topical anesthetics, and expansion applications. Preferably, the field is refrigeration.

Examples of suitable products include heat transfer devices, sprayable compositions, solvents and mechanical power generation devices. In a preferred embodiment, the product is a heat transfer device, such as a refrigeration device.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluorocarbon compound or it may comprise a fluorinated olefin.

Preferably, the existing compound or composition is a heat transfer compound or composition such as a refrigerant. Examples of refrigerants that may be replaced include R-410A, R454B, R-452B and R-32, preferably R-410A.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The compositions of the present invention may find particular utility in vapour compression heat transfer systems, such as refrigeration, air-conditioning and heat pump systems.

The refrigerant compositions of the invention will typically be combined with a lubricant when used in a vapour compression heat transfer system. Suitable lubricants include polyol esters, such as neopentyl polyol esters, and polyalkylene glycols, preferably end capped at both ends with an alkyl, e.g. a C$_{1-4}$ alkyl, group.

The invention is illustrated by the following non-limiting examples.

EXAMPLES

The invention is now illustrated by theoretical cycle modelling of performance of selected compositions of the invention in a cooling cycle (Examples 1-10).

R-410A was chosen as the reference refrigerant for all modelling experiments. The following conditions were assumed:

| Data Input Section | | R410A |
| --- | --- | --- |
| Cooling duty | kW | 6 |
| Mean condenser temperature | ° C. | 54.44 |
| Mean evaporator temperature | ° C. | 7.22 |
| Condenser subcooling | K | 8.33 |
| Evaporator superheat | K | 5.56 |
| Evaporator pressure drop | bar | 0 |
| Suction line pressure drop | bar | 0 |
| Condenser pressure drop | bar | 0 |
| Compressor suction superheat | K | 11.11 |
| Isentropic efficiency | | 70% |

The modelling was carried out in Microsoft Excel using NIST REFPROP10 as the thermodynamic data source. The phase equilibria of binary mixtures of R-1132a with R-134a, R-1234yf, R-125, R-152a, R-744, CF$_3$I and R-32; and of binary mixtures of CF$_3$I with R-32 and R-152a were first studied using a constant-volume apparatus to measure the vapour pressure of the mixtures at a temperature range of from −70° C. to +40° C. This data was then regressed to yield interaction parameters for use in REFPROP that reproduced the experimental data.

The cycle modelled was a standard air-conditioning vapour compression cycle comprising evaporator, compressor, condenser and expansion device.

Mixtures of the invention can offer capacity and energy efficiency (COP) close to those obtainable with R-410A and thus are suitable for use in air-conditioning applications. Certain preferred mixtures of the invention offer capacity and COP within 5% of the values obtainable with R-410A with temperature glides of less than 10K in evaporator and/or condenser. It is anticipated that such mixtures would be usable with minor adaptation of existing designs of equipment (intended for R-410A). Other compositions offer higher capacity but with higher temperature glide; such mixtures could nonetheless offer promise for new designs of equipment.

| Example 1 (ternary compositions comprising R-1132a, CF$_3$I and 20 wt %R-32) | | | | | | | | |
|---|---|---|---|---|---|---|---|---|
| | | | | | R1132a | | | |
| | | 35 | 30 | 25 | 20 | 15 | 10 | 5 |
| | | | | | R32 | | | |
| | | 20 | 20 | 20 | 20 | 20 | 20 | 20 |
| | | | | | CF3I | | | |
| Results | | R410A | 45 | 50 | 55 | 60 | 65 | 70 | 75* |
| Cooling COP | | 2.88 | 2.44 | 2.54 | 2.54 | 2.63 | 2.82 | 2.92 | 3.01 |
| Cooling COP relative to Reference | | 100.0% | 84.7% | 88.2% | 88.2% | 91.6% | 98.1% | 101.4% | 104.7% |
| Volumetric cooling capacity | kJ/m3 | 5260 | 5840 | 5667 | 5667 | 5454 | 4921 | 4602 | 4248 |
| Cooling Capacity relative to Reference | | 100.0% | 111.0% | 107.7% | 107.7% | 103.7% | 93.6% | 87.5% | 80.8% |
| Compressor discharge temperature | ° C. | 103.0 | 113.8 | 114.9 | 114.9 | 115.9 | 117.5 | 117.9 | 117.8 |
| Discharge temp. difference from reference | K | 0.0 | 10.8 | 11.9 | 11.9 | 12.9 | 14.5 | 14.9 | 14.8 |
| Evaporator inlet pressure | bar | 10.00 | 13.42 | 12.39 | 12.39 | 11.37 | 9.38 | 8.41 | 7.45 |
| Condenser inlet pressure | bar | 33.9 | 44.1 | 41.1 | 41.1 | 38.1 | 32.1 | 29.0 | 25.9 |
| Evaporator glide (out-in) | K | 0.1 | 12.1 | 13.2 | 13.2 | 14.1 | 15.0 | 14.9 | 14.2 |
| Condenser glide (in-out) | K | 0.1 | 7.1 | 9.0 | 9.0 | 10.6 | 13.2 | 13.9 | 13.8 |

| Example 2 (ternary compositions comprising R-1132a, CF$_3$I and 25 wt % R-32) | | | | | | | | |
|---|---|---|---|---|---|---|---|---|
| | | | | | R1132a | | | |
| | | 35 | 30 | 25 | 20 | 15 | 10 | 5 |
| | | | | | R32 | | | |
| | | 25 | 25 | 25 | 25 | 25 | 25 | 25 |
| | | | | | CF3I | | | |
| Results | | R410A | 40 | 45 | 50 | 55 | 60 | 65 | 70 |
| Cooling COP | | 2.88 | 2.43 | 2.52 | 2.61 | 2.70 | 2.79 | 2.87 | 2.96 |
| Cooling COP relative to Reference | | 100.0% | 84.5% | 87.8% | 90.9% | 93.9% | 96.8% | 99.8% | 102.8% |
| Volumetric cooling capacity | kJ/m3 | 5260 | 6028 | 5865 | 5661 | 5422 | 5148 | 4840 | 4498 |
| Cooling Capacity relative to Reference | | 100.0% | 114.6% | 111.5% | 107.6% | 103.1% | 97.9% | 92.0% | 85.5% |
| Compressor discharge temperature | ° C. | 103.0 | 113.3 | 114.3 | 115.4 | 116.4 | 117.2 | 117.8 | 118.1 |
| Discharge temp. difference from reference | K | 0.0 | 10.3 | 11.3 | 12.4 | 13.4 | 14.2 | 14.8 | 15.1 |
| Evaporator inlet pressure | bar | 10.00 | 13.97 | 12.96 | 11.96 | 10.97 | 9.99 | 9.02 | 8.06 |
| Condenser inlet pressure | bar | 33.9 | 45.4 | 42.6 | 39.7 | 36.8 | 33.8 | 30.9 | 27.8 |
| Evaporator glide (out-in) | K | 0.1 | 9.9 | 10.8 | 11.6 | 12.1 | 12.4 | 12.3 | 11.8 |
| Condenser glide (in-out) | K | 0.1 | 5.5 | 7.1 | 8.5 | 9.6 | 10.5 | 11.0 | 10.9 |

| Example 3 (ternary compositions comprising R-1132a, CF$_3$I and 30 wt % R-32) | | | | | | | | |
|---|---|---|---|---|---|---|---|---|
| | | | | | R1132a | | | |
| | | 35 | 30 | 25 | 20 | 15 | 10 | 5 |
| | | | | | R32 | | | |
| | | 30 | 30 | 30 | 30 | 30 | 30 | 30 |
| | | | | | CF3I | | | |
| Results | | R410A | 35 | 40 | 45 | 50 | 55 | 60 | 65 |
| Cooling COP | | 2.88 | 2.44 | 2.52 | 2.61 | 2.69 | 2.77 | 2.85 | 2.93 |
| Cooling COP relative to Reference | | 100.0% | 84.7% | 87.8% | 90.7% | 93.5% | 96.3% | 99.0% | 101.7% |
| Volumetric cooling capacity | kJ/m3 | 5260 | 6202 | 6048 | 5855 | 5625 | 5362 | 5064 | 4733 |
| Cooling Capacity relative to Reference | | 100.0% | 117.9% | 115.0% | 111.3% | 107.0% | 101.9% | 96.3% | 90.0% |
| Compressor discharge temperature | ° C. | 103.0 | 113.0 | 113.9 | 115.0 | 115.9 | 116.8 | 117.5 | 118.0 |
| Discharge temp. difference from reference | K | 0.0 | 10.0 | 11.0 | 12.0 | 12.9 | 13.8 | 14.5 | 15.0 |

-continued

Example 3 (ternary compositions comprising R-1132a, CF₃I and 30 wt % R-32)

|  |  |  | R1132a | | | | | | |
|---|---|---|---|---|---|---|---|---|---|
|  |  |  | 35 | 30 | 25 | 20 | 15 | 10 | 5 |
|  |  |  | R32 | | | | | | |
|  |  |  | 30 | 30 | 30 | 30 | 30 | 30 | 30 |
|  |  |  | CF3I | | | | | | |
| Results |  | R410A | 35 | 40 | 45 | 50 | 55 | 60 | 65 |
| Evaporator dewpoint | ° C. | 7.3 | 11.3 | 11.7 | 12.0 | 12.2 | 12.3 | 12.2 | 11.9 |
| Evaporator exit gas temperature | ° C. | 12.8 | 16.9 | 17.3 | 17.5 | 17.7 | 17.8 | 17.8 | 17.5 |
| Evaporator glide (out-in) | K | 0.1 | 8.3 | 8.9 | 9.5 | 9.9 | 10.1 | 9.9 | 9.4 |
| Condenser glide (in-out) | K | 0.1 | 4.4 | 5.7 | 6.9 | 7.8 | 8.4 | 8.7 | 8.5 |

Example 4 (ternary compositions comprising R-1132a, CF₃I and 35 wt % R-32)

|  |  |  | R1132a | | | | | | |
|---|---|---|---|---|---|---|---|---|---|
|  |  |  | 35 | 30 | 25 | 20 | 15 | 10 | 5 |
|  |  |  | R32 | | | | | | |
|  |  |  | 35 | 35 | 35 | 35 | 35 | 35 | 35 |
|  |  |  | CF3I | | | | | | |
| Results |  | R410A | 30 | 35 | 40 | 45 | 50 | 55 | 60 |
| Cooling COP |  | 2.88 | 2.45 | 2.53 | 2.61 | 2.69 | 2.76 | 2.84 | 2.91 |
| Cooling COP relative to Reference |  | 100.0% | 85.1% | 88.1% | 90.8% | 93.5% | 96.1% | 98.7% | 101.2% |
| Volumetric cooling capacity | kJ/m3 | 5260 | 6359 | 6211 | 6027 | 5809 | 5557 | 5271 | 4952 |
| Cooling Capacity relative to Reference |  | 100.0% | 120.9% | 118.1% | 114.6% | 110.4% | 105.6% | 100.2% | 94.1% |
| Compressor discharge temperature | ° C. | 103.0 | 113.0 | 113.9 | 114.8 | 115.6 | 116.5 | 117.2 | 117.7 |
| Discharge temp. difference from reference | K | 0.0 | 10.0 | 10.9 | 11.8 | 12.7 | 13.5 | 14.2 | 14.7 |
| Evaporator dewpoint | ° C. | 7.3 | 10.7 | 11.0 | 11.2 | 11.3 | 11.3 | 11.2 | 10.9 |
| Evaporator exit gas temperature | ° C. | 12.8 | 16.3 | 16.5 | 16.7 | 16.8 | 16.8 | 16.7 | 16.4 |
| Evaporator glide (out-in) | K | 0.1 | 7.0 | 7.5 | 7.9 | 8.1 | 8.1 | 7.9 | 7.3 |
| Condenser glide (in-out) | K | 0.1 | 3.7 | 4.8 | 5.7 | 6.4 | 6.9 | 7.0 | 6.7 |

40

Example 5 (ternary compositions comprising R-1132a, CF₃I and 40 wt % R-32)

|  |  |  | R1132a | | | | | |
|---|---|---|---|---|---|---|---|---|
|  |  |  | 35 | 30 | 25 | 20 | 10 | 5 |
|  |  |  | R32 | | | | | |
|  |  |  | 40 | 40 | 40 | 40 | 40 | 40 |
|  |  |  | CF3I | | | | | |
| Results |  | R410A | 25 | 30 | 35 | 40 | 50 | 55 |
| Cooling COP |  | 2.88 | 2.46 | 2.54 | 2.62 | 2.70 | 2.84 | 2.91 |
| Cooling COP relative to Reference |  | 100.0% | 85.7% | 88.5% | 91.1% | 93.7% | 98.7% | 101.1% |
| Volumetric cooling capacity | kJ/m3 | 5260 | 6494 | 6352 | 6176 | 5967 | 5454 | 5149 |
| Cooling Capacity relative to Reference |  | 100.0% | 123.5% | 120.8% | 117.4% | 113.5% | 103.7% | 97.9% |
| Compressor discharge temperature | ° C. | 103.0 | 113.3 | 114.1 | 114.9 | 115.7 | 117.0 | 117.5 |
| Discharge temp. difference from reference | K | 0.0 | 10.3 | 11.1 | 11.9 | 12.7 | 14.0 | 14.5 |
| Evaporator dewpoint | ° C. | 7.3 | 10.3 | 10.5 | 10.6 | 10.6 | 10.4 | 10.0 |
| Evaporator exit gas temperature | ° C. | 12.8 | 15.9 | 16.1 | 16.2 | 16.2 | 15.9 | 15.6 |
| Evaporator glide (out-in) | K | 0.1 | 6.2 | 6.6 | 6.8 | 6.8 | 6.3 | 5.6 |
| Condenser glide (in-out) | K | 0.1 | 3.3 | 4.2 | 4.9 | 5.4 | 5.7 | 5.2 |

Example 6 (quaternary compositions comprising R-1132a, CF₃I, 10 wt % R-125 and 10 wt % R-32)

| | | | R1132a | | | | | | |
|---|---|---|---|---|---|---|---|---|---|
| | | | 35 | 30 | 25 | 20 | 15 | 10 | 5 |
| | | | R32 | | | | | | |
| | | | 10 | 10 | 10 | 10 | 10 | 10 | 10 |
| | | | R125 | | | | | | |
| | | | 10 | 10 | 10 | 10 | 10 | 10 | 10 |
| | | | CF3I | | | | | | |
| Results | | R410A | 45 | 50 | 55 | 60 | 65 | 70 | 75* |
| Cooling COP | | 2.88 | 2.37 | 2.49 | 2.64 | 2.71 | 2.83 | 2.94 | 3.05 |
| Cooling COP relative to Reference | | 100.0% | 82.3% | 86.4% | 91.8% | 94.4% | 98.3% | 102.2% | 106.2% |
| Volumetric cooling capacity | kJ/m3 | 5260 | 5469 | 5316 | 5204 | 4871 | 4589 | 4268 | 3907 |
| Cooling Capacity relative to Reference | | 100.0% | 104.0% | 101.1% | 98.9% | 92.6% | 87.3% | 81.2% | 74.3% |
| Heating COP | | 3.88 | 3.37 | 3.49 | 3.64 | 3.71 | 3.83 | 3.94 | 4.05 |
| Critical temperature | ° C. | 71.3 | 59.5 | 63.4 | 67.6 | 72.3 | 77.3 | 82.8 | 88.9 |
| Critical pressure | bar | 49.0 | 48.7 | 48.9 | 49.0 | 49.1 | 49.0 | 48.7 | 48.3 |
| Refrigeration effect | kJ/kg | 153 | 95 | 97 | 98 | 98 | 98 | 97 | 96 |
| Pressure ratio | | 3.39 | 3.31 | 3.34 | 3.32 | 3.41 | 3.44 | 3.47 | 3.50 |
| Compressor discharge temperature | ° C. | 103.0 | 109.2 | 110.0 | 110.2 | 111.0 | 111.2 | 110.9 | 110.1 |
| Discharge temp. difference from reference | K | 0.0 | 6.2 | 7.0 | 7.2 | 8.0 | 8.2 | 7.9 | 7.1 |
| Evaporator inlet pressure | bar | 10.00 | 13.04 | 11.95 | 11.06 | 9.84 | 8.82 | 7.82 | 6.84 |
| Condenser inlet pressure | bar | 33.9 | 43.2 | 40.0 | 36.8 | 33.6 | 30.4 | 27.2 | 23.9 |
| Evaporator inlet temperature | ° C. | 7.2 | 0.7 | 0.0 | −1.1 | −1.0 | −1.2 | −1.2 | −0.8 |
| Evaporator dewpoint | ° C. | 7.3 | 13.8 | 14.4 | 15.5 | 15.4 | 15.6 | 15.6 | 15.2 |
| Evaporator exit gas temperature | ° C. | 12.8 | 19.3 | 20.0 | 21.1 | 21.0 | 21.2 | 21.2 | 20.8 |
| Evaporator glide (out-in) | K | 0.1 | 13.1 | 14.4 | 16.6 | 16.4 | 16.9 | 16.8 | 16.0 |
| Condenser dew point | ° C. | 54.5 | 58.1 | 59.3 | 60.3 | 61.3 | 62.0 | 62.5 | 62.6 |
| Condenser bubble point | ° C. | 54.4 | 50.8 | 49.6 | 48.6 | 47.6 | 46.9 | 46.4 | 46.3 |
| Condenser exit liquid temperature | ° C. | 46.1 | 42.5 | 41.3 | 40.2 | 39.3 | 38.5 | 38.0 | 38.0 |
| Condenser glide (in-out) | K | 0.1 | 7.3 | 9.7 | 11.8 | 13.7 | 15.2 | 16.1 | 16.3 |

Example 7 (quaternary compositions comprising R-1132a, CF₃I, 10 wt % R-125 and 20 wt % R-32)

| | | | R1132a | | | | | | |
|---|---|---|---|---|---|---|---|---|---|
| | | | 35 | 30 | 25 | 20 | 15 | 10 | 5 |
| | | | R32 | | | | | | |
| | | | 20 | 20 | 20 | 20 | 20 | 20 | 20 |
| | | | R125 | | | | | | |
| | | | 10 | 10 | 10 | 10 | 10 | 10 | 10 |
| | | | CF3I | | | | | | |
| Results | | R410A | 35 | 40 | 45 | 50 | 55 | 60 | 65 |
| Cooling COP | | 2.88 | 2.34 | 2.45 | 2.54 | 2.64 | 2.73 | 2.82 | 2.91 |
| Cooling COP relative to Reference | | 100.0% | 81.3% | 85.1% | 88.5% | 91.7% | 94.9% | 98.1% | 101.3% |
| Volumetric cooling capacity | kJ/m3 | 5260 | 5858 | 5733 | 5552 | 5330 | 5070 | 4773 | 4442 |
| Cooling Capacity relative to Reference | | 100.0% | 111.4% | 109.0% | 105.6% | 101.3% | 96.4% | 90.8% | 84.5% |
| Heating COP | | 3.88 | 3.34 | 3.45 | 3.54 | 3.64 | 3.73 | 3.82 | 3.91 |
| Critical temperature | ° C. | 71.3 | 56.8 | 60.1 | 63.6 | 67.3 | 71.3 | 75.7 | 80.4 |
| Critical pressure | bar | 49.0 | 49.2 | 49.4 | 49.4 | 49.4 | 49.4 | 49.2 | 48.8 |
| Refrigeration effect | kJ/kg | 153 | 102 | 104 | 106 | 106 | 107 | 106 | 105 |
| Pressure ratio | | 3.39 | 3.24 | 3.27 | 3.30 | 3.34 | 3.38 | 3.42 | 3.45 |
| Compressor discharge temperature | ° C. | 103.0 | 108.6 | 109.3 | 110.1 | 110.8 | 111.4 | 111.7 | 111.7 |
| Discharge temp. difference from reference | K | 0.0 | 5.6 | 6.3 | 7.1 | 7.8 | 8.4 | 8.7 | 8.7 |
| Evaporator inlet pressure | bar | 10.00 | 14.31 | 13.27 | 12.23 | 11.20 | 10.18 | 9.18 | 8.19 |
| Condenser inlet pressure | bar | 33.9 | 46.4 | 43.4 | 40.4 | 37.4 | 34.4 | 31.4 | 28.2 |
| Evaporator inlet temperature | ° C. | 7.2 | 2.9 | 2.5 | 2.1 | 1.7 | 1.5 | 1.5 | 1.6 |
| Evaporator dewpoint | ° C. | 7.3 | 11.5 | 12.0 | 12.4 | 12.7 | 12.9 | 13.0 | 12.8 |
| Evaporator exit gas temperature | ° C. | 12.8 | 17.1 | 17.5 | 17.9 | 18.3 | 18.5 | 18.5 | 18.4 |
| Evaporator glide (out-in) | K | 0.1 | 8.6 | 9.5 | 10.3 | 11.0 | 11.4 | 11.5 | 11.2 |
| Condenser dew point | ° C. | 54.5 | 56.4 | 57.2 | 58.0 | 58.6 | 59.1 | 59.4 | 59.5 |
| Condenser bubble point | ° C. | 54.4 | 52.5 | 51.6 | 50.9 | 50.3 | 49.8 | 49.5 | 49.4 |
| Condenser exit liquid temperature | ° C. | 46.1 | 44.2 | 43.3 | 42.6 | 42.0 | 41.5 | 41.1 | 41.1 |
| Condenser glide (in-out) | K | 0.1 | 3.8 | 5.6 | 7.1 | 8.3 | 9.3 | 9.9 | 10.0 |

Example 8 (quaternary compositions comprising R-1132a, CF₃I, 10 wt % R-125 and 25 wt % R-32)

| | | | | | R1132a | | | |
| --- | --- | --- | --- | --- | --- | --- | --- | --- |
| | | 35 | 30 | 25 | 20 | 15 | 10 | 5 |
| | | | | | R32 | | | |
| | | 25 | 25 | 25 | 25 | 25 | 25 | 25 |
| | | | | | R125 | | | |
| | | 10 | 10 | 10 | 10 | 10 | 10 | 10 |
| | | | | | CF3I | | | |
| Results | | R410A | 30 | 35 | 40 | 45 | 50 | 55 | 60 |
| Cooling COP | | 2.88 | 2.35 | 2.45 | 2.54 | 2.63 | 2.72 | 2.80 | 2.88 |
| Cooling COP relative to Reference | | 100.0% | 81.7% | 85.3% | 88.5% | 91.5% | 94.5% | 97.4% | 100.3% |
| Volumetric cooling capacity | kJ/m3 | 5260 | 6038 | 5922 | 5751 | 5540 | 5290 | 5004 | 4683 |
| Cooling Capacity relative to Reference | | 100.0% | 114.8% | 112.6% | 109.3% | 105.3% | 100.6% | 95.1% | 89.0% |
| Heating COP | | 3.88 | 3.35 | 3.45 | 3.54 | 3.63 | 3.72 | 3.80 | 3.88 |
| Critical temperature | ° C. | 71.3 | 56.3 | 59.3 | 62.5 | 66.0 | 69.6 | 73.5 | 77.8 |
| Critical pressure | bar | 49.0 | 49.7 | 49.8 | 49.8 | 49.8 | 49.7 | 49.4 | 49.1 |
| Refrigeration effect | kJ/kg | 153 | 107 | 109 | 111 | 111 | 112 | 112 | 111 |
| Pressure ratio | | 3.39 | 3.22 | 3.24 | 3.27 | 3.31 | 3.34 | 3.38 | 3.42 |
| Compressor discharge temperature | ° C. | 103.0 | 108.5 | 109.2 | 109.9 | 110.5 | 111.1 | 111.6 | 111.7 |
| Discharge temp. difference from reference | K | 0.0 | 5.5 | 6.2 | 6.9 | 7.6 | 8.2 | 8.6 | 8.8 |
| Evaporator inlet pressure | bar | 10.00 | 14.73 | 13.73 | 12.73 | 11.73 | 10.73 | 9.74 | 8.76 |
| Condenser inlet pressure | bar | 33.9 | 47.4 | 44.5 | 41.7 | 38.8 | 35.9 | 33.0 | 29.9 |
| Evaporator inlet temperature | ° C. | 7.2 | 3.7 | 3.3 | 3.0 | 2.8 | 2.7 | 2.7 | 2.9 |
| Evaporator dewpoint | ° C. | 7.3 | 10.8 | 11.1 | 11.4 | 11.6 | 11.8 | 11.7 | 11.6 |
| Evaporator exit gas temperature | ° C. | 12.8 | 16.3 | 16.7 | 17.0 | 17.2 | 17.3 | 17.3 | 17.1 |
| Evaporator glide (out-in) | K | 0.1 | 7.1 | 7.8 | 8.4 | 8.8 | 9.1 | 9.1 | 8.7 |
| Condenser dew point | ° C. | 54.5 | 55.9 | 56.7 | 57.3 | 57.8 | 58.1 | 58.3 | 58.3 |
| Condenser bubble point | ° C. | 54.4 | 53.0 | 52.2 | 51.6 | 51.1 | 50.8 | 50.6 | 50.6 |
| Condenser exit liquid temperature | ° C. | 46.1 | 44.6 | 43.9 | 43.3 | 42.8 | 42.4 | 42.2 | 42.3 |
| Condenser glide (in-out) | K | 0.1 | 3.0 | 4.5 | 5.7 | 6.6 | 7.3 | 7.7 | 7.7 |

Example 9 (quaternary compositions comprising R-1132a, CF₃I, 14 wt % R-125 and 25 wt % R-32)

| | | | | | R1132a | | | |
| --- | --- | --- | --- | --- | --- | --- | --- | --- |
| | | 35 | 30 | 25 | 20 | 15 | 10 | 5 |
| | | | | | R32 | | | |
| | | 25 | 25 | 25 | 25 | 25 | 25 | 25 |
| | | | | | R125 | | | |
| | | 14 | 14 | 14 | 14 | 14 | 14 | 14 |
| | | | | | CF3I | | | |
| Results | | R410A | 26 | 31 | 36 | 41 | 46 | 51 | 56 |
| Cooling COP | | 2.88 | 2.31 | 2.43 | 2.52 | 2.61 | 2.69 | 2.78 | 2.86 |
| Cooling COP relative to Reference | | 100.0% | 80.4% | 84.3% | 87.6% | 90.7% | 93.7% | 96.6% | 99.4% |
| Volumetric cooling capacity | kJ/m3 | 5260 | 6018 | 5931 | 5775 | 5576 | 5338 | 5062 | 4749 |
| Cooling Capacity relative to Reference | | 100.0% | 114.4% | 112.8% | 109.8% | 106.0% | 101.5% | 96.2% | 90.3% |
| Heating COP | | 3.88 | 3.31 | 3.43 | 3.52 | 3.61 | 3.69 | 3.78 | 3.86 |
| Critical temperature | ° C. | 71.3 | 55.3 | 58.2 | 61.2 | 64.5 | 68.0 | 71.8 | 75.8 |
| Critical pressure | bar | 49.0 | 49.2 | 49.3 | 49.3 | 49.2 | 49.0 | 48.8 | 48.4 |
| Refrigeration effect | kJ/kg | 153 | 106 | 108 | 109 | 110 | 110 | 110 | 110 |
| Pressure ratio | | 3.39 | 3.22 | 3.23 | 3.26 | 3.29 | 3.33 | 3.36 | 3.40 |
| Compressor discharge temperature | ° C. | 103.0 | 107.1 | 107.4 | 108.0 | 108.5 | 109.0 | 109.3 | 109.4 |
| Discharge temp. difference from reference | K | 0.0 | 4.1 | 4.4 | 5.0 | 5.5 | 6.0 | 6.3 | 6.4 |
| Evaporator inlet pressure | bar | 10.00 | 14.97 | 13.99 | 13.00 | 12.01 | 11.01 | 10.02 | 9.03 |
| Condenser inlet pressure | bar | 33.9 | 48.2 | 45.2 | 42.4 | 39.5 | 36.6 | 33.7 | 30.7 |
| Evaporator inlet temperature | ° C. | 7.2 | 4.1 | 3.8 | 3.6 | 3.4 | 3.3 | 3.3 | 3.5 |
| Evaporator dewpoint | ° C. | 7.3 | 10.3 | 10.6 | 10.9 | 11.1 | 11.1 | 11.1 | 10.9 |
| Evaporator exit gas temperature | ° C. | 12.8 | 15.9 | 16.2 | 16.4 | 16.6 | 16.7 | 16.7 | 16.5 |
| Evaporator glide (out-in) | K | 0.1 | 6.2 | 6.8 | 7.3 | 7.7 | 7.8 | 7.8 | 7.5 |
| Condenser dew point | ° C. | 54.5 | 55.4 | 56.3 | 56.8 | 57.3 | 57.6 | 57.8 | 57.7 |
| Condenser bubble point | ° C. | 54.4 | 53.5 | 52.6 | 52.0 | 51.6 | 51.3 | 51.1 | 51.2 |
| Condenser exit liquid temperature | ° C. | 46.1 | 45.1 | 44.3 | 43.7 | 43.3 | 43.0 | 42.8 | 42.9 |
| Condenser glide (in-out) | K | 0.1 | 2.0 | 3.7 | 4.8 | 5.7 | 6.3 | 6.6 | 6.5 |

Example 10 (quaternary compositions comprising R-1132a, CF₃I, 10 wt % R-125 and 30 wt % R-32)

| | | | | | R1132a | | | |
| --- | --- | --- | --- | --- | --- | --- | --- | --- |
| | | 35 | 30 | 25 | 20 | 15 | 10 | 5 |
| | | | | | R32 | | | |
| | | 30 | 30 | 30 | 30 | 30 | 30 | 30 |
| | | | | | R125 | | | |
| | | 10 | 10 | 10 | 10 | 10 | 10 | 10 |
| | | | | | CF3I | | | |
| Results | | R410A | 25 | 30 | 35 | 40 | 45 | 50 | 55 |
| Cooling COP | | 2.88 | 2.37 | 2.47 | 2.55 | 2.64 | 2.72 | 2.80 | 2.87 |
| Cooling COP relative to Reference | | 100.0% | 82.3% | 85.7% | 88.8% | 91.7% | 94.5% | 97.2% | 99.9% |
| Volumetric cooling capacity | kJ/m3 | 5260 | 6203 | 6089 | 5927 | 5726 | 5488 | 5215 | 4906 |
| Cooling Capacity relative to Reference | | 100.0% | 117.9% | 115.8% | 112.7% | 108.9% | 104.3% | 99.1% | 93.3% |
| Heating COP | 3.88 | 3.37 | 3.47 | 3.55 | 3.64 | 3.72 | 3.80 | 3.87 | |
| Critical temperature | ° C. | 71.3 | 56.1 | 59.0 | 61.9 | 65.1 | 68.5 | 72.1 | 75.9 |
| Critical pressure | bar | 49.0 | 50.3 | 50.3 | 50.3 | 50.3 | 50.1 | 49.8 | 49.4 |
| Refrigeration effect | kJ/kg | 153 | 114 | 115 | 117 | 117 | 118 | 117 | 117 |
| Pressure ratio | | 3.39 | 3.21 | 3.23 | 3.25 | 3.28 | 3.32 | 3.35 | 3.38 |
| Compressor discharge temperature | ° C. | 103.0 | 108.9 | 109.4 | 110.0 | 110.5 | 111.1 | 111.5 | 111.7 |
| Discharge temp. difference from reference | K | 0.0 | 5.9 | 6.4 | 7.0 | 7.5 | 8.1 | 8.5 | 8.7 |
| Evaporator inlet pressure | bar | 10.00 | 15.01 | 14.06 | 13.11 | 12.15 | 11.18 | 10.22 | 9.26 |
| Condenser inlet pressure | bar | 33.9 | 48.2 | 45.4 | 42.6 | 39.9 | 37.1 | 34.3 | 31.3 |
| Evaporator inlet temperature | ° C. | 7.2 | 4.2 | 3.9 | 3.8 | 3.6 | 3.6 | 3.7 | 3.9 |
| Evaporator dewpoint | ° C. | 7.3 | 10.3 | 10.5 | 10.7 | 10.8 | 10.8 | 10.7 | 10.5 |
| Evaporator exit gas temperature | ° C. | 12.8 | 15.8 | 16.1 | 16.2 | 16.4 | 16.4 | 16.3 | 16.1 |
| Evaporator glide (out-in) | K | 0.1 | 6.1 | 6.6 | 6.9 | 7.2 | 7.2 | 7.0 | 6.6 |
| Condenser dew point | ° C. | 54.5 | 55.7 | 56.3 | 56.8 | 57.2 | 57.4 | 57.5 | 57.4 |
| Condenser bubble point | ° C. | 54.4 | 53.2 | 52.6 | 52.1 | 51.7 | 51.5 | 51.4 | 51.5 |
| Condenser exit liquid temperature | ° C. | 46.1 | 44.9 | 44.2 | 43.8 | 43.4 | 43.1 | 43.1 | 43.2 |
| Condenser glide (in-out) | K | 0.1 | 2.5 | 3.8 | 4.7 | 5.4 | 5.9 | 6.1 | 5.9 |

Examples 11 to 15 demonstrate the theoretical cycle modelling of performance of selected compositions of the present invention in a heat pump cycle. R-1234yf was chosen as the reference refrigerant for the heat pump cycle.

The modelling was carried out in Microsoft Excel using NIST REFPROP10 as the thermodynamic data source. The phase equilibrium of mixtures of R-1132a with R-32 and R-1234yf was first studied using a constant-volume apparatus to measure the vapour pressure of binary mixtures of R-1132a/R-32 or R-1132a/R-1234yf over a range of temperatures from –70 C to +40 C. This data was then regressed to yield binary interaction parameters for use in REFPROP that reproduced the experimental data.

The cycle modelled included intermediate pressure vapour injection of refrigerant vapour to improve cycle performance. For each composition the optimum injection pressure was determined so as to maximise the Coefficient of Performance (COP) for heating.

For the heat pump cycle the following conditions were assumed:

| Data Input Section | | R-1234yf |
| --- | --- | --- |
| Compressor displacement | m3/hr | 16.5 |
| Mean condenser temperature | ° C. | 45.0 |
| Mean evaporator temperature | ° C. | −25.0 |
| Condenser subcooling | K | 3.0 |
| Evaporator superheat | K | 1.0 |
| Evaporator pressure drop | bar | 0.20 |
| Suction line pressure drop | bar | 0.10 |
| Condenser pressure drop | bar | 0.20 |
| Compressor suction superheat | K | 10.0 |
| Isentropic efficiency | | 65.0% |

Example 11 (binary compositions comprising R-1132a and CF₃I)

| | | | R1132a | | | | | |
| --- | --- | --- | --- | --- | --- | --- | --- | --- |
| | | | 4% | 6% | 8% | 10% | 12% | 14% |
| | | | | | CF3I | | | |
| | | | 96% | 94% | 92% | 90% | 88% | 86% |
| Results | | R1234yf | 4%/96% | 6%/94% | 8%/92% | 10%/90% | 12%/88% | 14%/86% |
| Heating COP | | 2.39 | 2.60 | 2.58 | 2.56 | 2.54 | 2.53 | 2.52 |
| Volumetric heating Capacity | kJ/m3 | 1108 | 1189 | 1310 | 1431 | 1553 | 1675 | 1795 |
| Heating Capacity relative to Reference | | 100.0% | 107.3% | 118.3% | 129.2% | 140.2% | 151.2% | 162.1% |
| Pressure ratio | | 9.39 | 10.25 | 10.35 | 10.31 | 10.20 | 10.05 | 9.88 |
| Compressor discharge temperature | ° C. | 71.6 | 123.2 | 126.2 | 128.2 | 129.6 | 130.5 | 131.1 |
| Discharge temp. difference from reference | K | 0.0 | 51.6 | 54.5 | 56.5 | 57.9 | 58.9 | 59.5 |

-continued

Example 11 (binary compositions comprising R-1132a and CF₃I)

| | | | R1132a | | | | | |
|---|---|---|---|---|---|---|---|---|
| | | | 4% | 6% | 8% | 10% | 12% | 14% |
| | | | | | CF3I | | | |
| | | | 96% | 94% | 92% | 90% | 88% | 86% |
| Results | | R1234yf | 4%/96% | 6%/94% | 8%/92% | 10%/90% | 12%/88% | 14%/86% |
| Evaporator inlet pressure | bar | 1.23 | 1.10 | 1.22 | 1.34 | 1.47 | 1.61 | 1.75 |
| Condenser inlet pressure | bar | 11.54 | 11.27 | 12.59 | 13.83 | 15.02 | 16.17 | 17.28 |
| Evaporator glide (out-in) | K | 0.0 | 4.6 | 6.8 | 9.0 | 10.9 | 12.7 | 14.3 |
| Condenser glide (in-out) | K | 0.0 | 15.2 | 19.6 | 22.7 | 24.9 | 26.4 | 27.3 |

Example 12 (ternary compositions comprising 4 wt % R-1132a, R-1234yf and CF₃I)

| | | | R1132a | | | | | | |
|---|---|---|---|---|---|---|---|---|---|
| | | | 4% | 4% | 4% | 4% | 4% | 4% | 4% |
| | | | | | | R1234yf | | | |
| | | | 10% | 20% | 30% | 40% | 50% | 60% | 70% |
| | | | | | | CF3I | | | |
| Results | | R1234yf | 86% | 76% | 66% | 56% | 46% | 36% | 26% |
| Heating COP | | 2.39 | 2.57 | 2.54 | 2.51 | 2.48 | 2.45 | 2.43 | 2.41 |
| Volumetric heating Capacity | kJ/m3 | 1108 | 1248 | 1288 | 1312 | 1322 | 1320 | 1308 | 1290 |
| Heating Capacity relative to Reference | | 100.0% | 112.7% | 116.3% | 118.4% | 119.4% | 119.2% | 118.1% | 116.5% |
| Pressure ratio | | 9.39 | 9.88 | 9.63 | 9.47 | 9.38 | 9.36 | 9.39 | 9.46 |
| Compressor discharge temperature | ° C. | 71.6 | 111.0 | 102.0 | 95.2 | 89.9 | 86.0 | 83.0 | 80.6 |
| Discharge temp. difference from reference | K | 0.0 | 39.4 | 30.4 | 23.5 | 18.3 | 14.4 | 11.3 | 9.0 |
| Evaporator inlet pressure | bar | 1.23 | 1.20 | 1.28 | 1.35 | 1.39 | 1.41 | 1.41 | 1.40 |
| Condenser inlet pressure | bar | 11.54 | 11.88 | 12.37 | 12.75 | 13.02 | 13.19 | 13.27 | 13.28 |
| Evaporator glide (out-in) | K | 0.0 | 4.5 | 3.9 | 3.1 | 2.4 | 1.9 | 1.6 | 1.5 |
| Condenser glide (in-out) | K | 0.0 | 12.7 | 10.5 | 8.6 | 7.1 | 6.1 | 5.5 | 5.1 |

Example 13 (ternary compositions comprising 8 wt % R-1132a, R-1234yf and CF₃I)

| | | | R1132a | | | | | |
|---|---|---|---|---|---|---|---|---|
| | | | 8% | 8% | 8% | 8% | 8% | 8% |
| | | | | | | R1234yf | | |
| | | | 10% | 20% | 30% | 40% | 50% | 60% |
| | | | | | | CF3I | | |
| Results | | R1234yf | 82% | 72% | 62% | 52% | 42% | 32% |
| Heating COP | | 2.39 | 2.53 | 2.50 | 2.48 | 2.45 | 2.43 | 2.41 |
| Volumetric heating Capacity | kJ/m3 | 1108 | 1467 | 1488 | 1496 | 1491 | 1476 | 1452 |
| Heating Capacity relative to Reference | | 100.0% | 132.5% | 134.3% | 135.0% | 134.6% | 133.2% | 131.1% |
| Pressure ratio | | 9.39 | 9.95 | 9.72 | 9.58 | 9.51 | 9.51 | 9.56 |
| Compressor discharge temperature | ° C. | 71.6 | 115.6 | 106.3 | 99.3 | 93.9 | 89.8 | 86.7 |
| Discharge temp. difference from reference | K | 0.0 | 44.0 | 34.7 | 27.6 | 22.3 | 18.2 | 15.1 |
| Evaporator inlet pressure | bar | 1.23 | 1.43 | 1.50 | 1.55 | 1.57 | 1.58 | 1.57 |
| Condenser inlet pressure | bar | 11.54 | 14.24 | 14.57 | 14.82 | 14.97 | 15.03 | 15.02 |
| Evaporator glide (out-in) | K | 0.0 | 7.9 | 6.5 | 5.2 | 4.2 | 3.5 | 3.1 |
| Condenser glide (in-out) | K | 0.0 | 18.7 | 15.5 | 13.1 | 11.3 | 10.1 | 9.3 |

Example 14 (ternary compositions comprising 10 wt % R-1132a, R-1234yf and CF₃I)

| | | R1234yf | R1132a | | | | | |
| --- | --- | --- | --- | --- | --- | --- | --- | --- |
| | | | 10% | 10% | 10% | 10% | 10% | 10% |
| | | | R1234yf | | | | | |
| | | | 10% | 20% | 30% | 40% | 50% | 60% |
| | | | CF3I | | | | | |
| Results | | | 80% | 70% | 60% | 50% | 40% | 30% |
| Heating COP | | 2.39 | 2.52 | 2.49 | 2.46 | 2.44 | 2.41 | 2.40 |
| Volumetric heating Capacity | kJ/m3 | 1108 | 1577 | 1588 | 1587 | 1576 | 1554 | 1524 |
| Heating Capacity relative to Reference | | 100.0% | 142.4% | 143.4% | 143.3% | 142.2% | 140.3% | 137.6% |
| Pressure ratio | | 9.39 | 9.89 | 9.69 | 9.57 | 9.52 | 9.53 | 9.60 |
| Compressor discharge temperature | ° C. | 71.6 | 117.2 | 107.9 | 100.9 | 95.5 | 91.4 | 88.3 |
| Discharge temp. difference from reference | K | 0.0 | 45.5 | 36.3 | 29.2 | 23.9 | 19.8 | 16.7 |
| Evaporator inlet pressure | bar | 1.23 | 1.55 | 1.61 | 1.65 | 1.67 | 1.67 | 1.65 |
| Condenser inlet pressure | bar | 11.54 | 15.36 | 15.63 | 15.82 | 15.92 | 15.93 | 15.87 |
| Evaporator glide (out-in) | K | 0.0 | 9.3 | 7.7 | 6.2 | 5.0 | 4.3 | 3.9 |
| Condenser glide (in-out) | K | 0.0 | 20.6 | 17.2 | 14.6 | 12.8 | 11.5 | 10.8 |

Example 15 (quaternary compositions comprising 4 wt % R-1132a, 8 wt % R-32, R-1234yf and CF₃I)

| | | R1234yf | R1132a | | | | |
| --- | --- | --- | --- | --- | --- | --- | --- |
| | | | 4% | 4% | 4% | 4% | 4% |
| | | | R32 | | | | |
| | | | 8% | 8% | 8% | 8% | 8% |
| | | | R1234yf | | | | |
| | | | 10% | 20% | 30% | 40% | 50% |
| | | | CF3I | | | | |
| Results | | | 78% | 68% | 58% | 48% | 38% |
| Heating COP | | 2.39 | 2.55 | 2.52 | 2.49 | 2.47 | 2.45 |
| Volumetric heating Capacity | kJ/m3 | 1108 | 1747 | 1740 | 1724 | 1700 | 1667 |
| Heating Capacity relative to Reference | | 100.0% | 157.7% | 157.1% | 155.7% | 153.5% | 150.5% |
| Pressure ratio | | 9.39 | 9.36 | 9.28 | 9.24 | 9.24 | 9.29 |
| Compressor discharge temperature | ° C. | 71.6 | 122.6 | 113.0 | 105.6 | 100.0 | 95.7 |
| Discharge temp. difference from reference | K | 0.0 | 50.9 | 41.4 | 34.0 | 28.4 | 24.1 |
| Evaporator inlet pressure | bar | 1.23 | 1.73 | 1.77 | 1.79 | 1.79 | 1.78 |
| Condenser inlet pressure | bar | 11.54 | 16.19 | 16.41 | 16.55 | 16.58 | 16.53 |
| Evaporator glide (out-in) | K | 0.0 | 10.5 | 8.4 | 6.6 | 5.4 | 4.7 |
| Condenser glide (in-out) | K | 0.0 | 17.5 | 14.6 | 12.4 | 10.9 | 9.9 |

The invention claimed is:

1. A ternary or higher refrigerant composition comprising from 26 to 86 weight % trifluoroiodomethane (CF₃I), 4 to 10 weight % 1,1-difluoroethylene (R-1132a), and 10 to 70 weight % 2,3,3,3-tetrafluoropropene (R-1234yf), based on the total weight of the composition.

2. The composition of claim 1 which comprises from 26 to 50 weight % of CF₃I.

3. The composition of claim 1 wherein the CF₃I is present in an amount of from 26 to 70 weight % based on the total weight of the composition.

4. The composition of claim 1 wherein the composition comprises:

from 26 to about 50 weight % CF₃I and from 10 to about 40 weight % R-1234yf.

5. The composition according to claim 1, wherein the composition comprises from 28 to 82 weight % of CF₃I, from 4 to 10 weight % of R-1132a and from 10 to 60 weight % of R-1234yf based on the total weight of the composition.

6. The composition of claim 1 wherein the composition further comprises carbon dioxide (CO₂; R-744).

7. The composition of claim 6 wherein the CO₂ is present in an amount of from about 1 to about 40 weight % based on the total weight of the composition.

8. The composition of claim 6 wherein the CO₂ is present in an amount of from about 1 to about 30 weight % based on the total weight of the composition.

9. The composition of claim 6 wherein the CO₂ is present in an amount of from about 1 to about 20 weight % based on the total weight of the composition.

10. The composition of claim 6 wherein the CO₂ is present in an amount of from about 1 to about 10 weight % based on the total weight of the composition.

11. The composition according to claim 1, wherein the composition further comprises R-32.

12. The composition according to claim 1 comprising from 28 to 82 weight % of CF₃I, from 4 to 10 weight % of R-1132a, from 5 to 12 weight % of R-32 and from 10 to 60 weight % of R-1234yf based on the total weight of the composition.

13. The composition of claim 1 further comprising a stabilizer, wherein the stabilizer is selected from the group consisting of diene-based compounds, phosphates, phenol compounds and epoxides, and mixtures thereof.

14. The composition of claim 1 which is non-flammable or only weakly flammable as determined by the test method of ASHRAE Standard 34:2016.

15. A composition of claim 1 consisting essentially of the stated components.

16. A composition of claim 1, wherein the refrigerant composition has:
   a. a higher flammable limit;
   b. a higher ignition energy; and/or
   c. a lower flame velocity
compared to R-1132a alone.

17. A composition of claim 1, wherein the refrigerant composition is non-flammable at ambient temperature, or wherein the composition is non-flammable at 60° C.

18. The composition of claim 1 which has a Global Warming Potential (GWP) below 150.

19. The composition of claim 1 wherein the refrigerant composition has a temperature glide in an evaporator or condenser of less than about 10K.

20. A method of heat transfer comprising providing a composition as claimed in claim 1 as a refrigerant in a vapour compression heat transfer system.

21. A vapour compression heat transfer system comprising a composition as claimed in claim 1.

22. The vapour compression heat transfer system of claim 21 which further comprises a lubricant comprising a polyolester (POE) or polyalkylene glycol (PAG) lubricant.

23. A method of producing cooling which comprises evaporating a composition as claimed in claim 1 in the vicinity of a body to be cooled.

24. A method of producing heating which comprises condensing a refrigerant composition as claimed in claim 1 in the vicinity of a body to be heated.

25. A sprayable composition comprising material to be sprayed and a propellant comprising a composition as defined in claim 1.

26. A method for extracting a substance from biomass comprising contacting biomass with a solvent comprising a composition as defined in claim 1 and separating the substance from the solvent.

27. A method of cleaning an article comprising contacting the article with a solvent comprising a composition as defined in claim 1.

28. A method of extracting a material from an aqueous solution or from a particulate solid matrix comprising contacting the aqueous solution or the particulate solid matrix with a solvent comprising a composition as defined in claim 1 and separating the material from the solvent.

29. A mechanical power generation device containing a composition as defined in claim 1.

30. A mechanical power generating device according to claim 29 which is adapted to use a Rankine Cycle or modification thereof to generate work from heat.

31. A method of retrofitting a heat transfer device comprising the step of removing an existing heat transfer composition, and introducing a composition as defined in claim 1.

32. A method of claim 31 wherein the heat transfer device is a commercial or industrial refrigeration device, a heat pump, or a residential or commercial air conditioning system.

33. A method according to claim 31 wherein the existing heat transfer composition comprises R-410A, R-454B, R-452B or R-32.

34. A method for reducing the environmental impact arising from the operation of a product comprising an existing compound or composition, the method comprising replacing at least partially the existing compound or composition with a composition as defined in claim 1.

35. A method of claim 34 wherein the use of the composition results in a lower Total Equivalent Warming Impact, and/or a lower Life-Cycle Carbon Production than is attained by use of the existing compound or composition.

36. A method of claim 34 carried out on a product from the fields of air-conditioning, refrigeration, heat transfer, aerosols or sprayable propellants, gaseous dielectrics, flame suppression, solvents, cleaners, topical anaesthetics, and expansion applications.

37. A method according to claim 34 wherein the product is selected from a heat transfer device, a sprayable composition, a solvent or a mechanical power generation device.

38. A method according to claim 37 wherein the product is a heat transfer device, which comprises a residential or commercial air conditioning system, a heat pump or a commercial or industrial refrigeration system.

* * * * *